(12) United States Patent
Liu et al.

(10) Patent No.: US 9,451,860 B2
(45) Date of Patent: Sep. 27, 2016

(54) CYCLONE SEPARATOR

(71) Applicants: JIANGSU MIDEA CLEANING APPLIANCES CO., LTD., Jiangsu (CN); MIDEA GROUP CO., LTD., Foshan (CN)

(72) Inventors: Shenghui Liu, Jiangsu (CN); Quan Xu, Jiangsu (CN)

(73) Assignee: Jiangsu Midea Cleaning Appliances Co., Ltd., Jiangsu (CN)

( * ) Notice: Subject to any disclaimer, the term of this patent is extended or adjusted under 35 U.S.C. 154(b) by 0 days.

(21) Appl. No.: 14/853,129

(22) Filed: Sep. 14, 2015

(65) Prior Publication Data
US 2016/0000286 A1 Jan. 7, 2016

Related U.S. Application Data

(63) Continuation of application No. PCT/CN2014/075274, filed on Apr. 14, 2014.

(51) Int. Cl.
*B01D 50/00* (2006.01)
*A47L 9/16* (2006.01)
*B01D 45/16* (2006.01)
(Continued)

(52) U.S. Cl.
CPC ............. *A47L 9/1683* (2013.01); *A47L 9/165* (2013.01); *B01D 45/12* (2013.01); *B01D 45/16* (2013.01); *B01D 50/002* (2013.01); *B01D 46/2411* (2013.01)

(58) Field of Classification Search
CPC .... B01D 45/16; B01D 50/002; B01D 45/12; B01D 46/2411; A47L 9/1608; A47L 9/1683

USPC ......... 55/337, 424, 426, 428, 429, 449, 447, 55/DIG. 3
See application file for complete search history.

(56) References Cited

U.S. PATENT DOCUMENTS 2,633,596 A   4/1953   Turner et al.
5,093,956 A   3/1992   Saunders et al.
(Continued)

FOREIGN PATENT DOCUMENTS

CN   1947641 A   4/2007
CN   1954764 A   4/2007
(Continued)

OTHER PUBLICATIONS

U.S. Appl. No. 14/852,953 Non-Final Office Action dated Nov. 2, 2015, 10 pages.
(Continued)

*Primary Examiner* — Dung H Bui
(74) *Attorney, Agent, or Firm* — Lathrop & Gage LLP

(57) ABSTRACT

A cyclone separator is provided. The cyclone separator includes: a cyclone, an end cover of the cyclone separator, a filter and a wind guiding cylinder. The cyclone has an open end and a bottom wall defining an inlet of the cyclone separator therein. The end cover of the cyclone separator is disposed over the cyclone and defines an outlet of the cyclone separator therein. The filter has an upper end communicating with the outlet of the cyclone separator and a lower end extended into the cyclone. The wind guiding cylinder has a lower end communicating with the inlet of the cyclone separator, a closed upper end and a side wall defining a vent communicating with the cyclone.

18 Claims, 4 Drawing Sheets

(51) Int. Cl.
*B01D 45/12* (2006.01)
*B01D 46/24* (2006.01)

(56) References Cited

U.S. PATENT DOCUMENTS

| | | | | |
|---|---|---|---|---|
| 7,114,216 | B2* | 10/2006 | Stephens | A47L 5/28 15/326 |
| 7,422,615 | B2* | 9/2008 | Kim | A47L 9/1608 55/426 |
| 7,708,791 | B2* | 5/2010 | Oh | A47L 9/1625 15/353 |
| 7,749,294 | B2* | 7/2010 | Oh | A47L 5/28 15/319 |
| 7,770,256 | B1* | 8/2010 | Fester | A47L 9/1641 15/353 |
| 7,776,116 | B2* | 8/2010 | Oh | A47L 9/0081 55/345 |
| 7,780,752 | B2* | 8/2010 | Cha | A47L 9/122 55/288 |
| 7,785,381 | B2* | 8/2010 | Oh | A47L 9/108 15/347 |
| 7,803,205 | B2* | 9/2010 | Oh | A47L 9/122 55/337 |
| 7,883,560 | B2* | 2/2011 | Ni | A47L 9/1625 15/352 |
| 8,252,096 | B2* | 8/2012 | Horne | A47L 9/10 55/DIG. 3 |
| 2002/0129461 | A1* | 9/2002 | Wegelin | A47L 5/34 15/359 |
| 2004/0154126 | A1* | 8/2004 | Hansen | A47L 9/1666 15/353 |
| 2004/0231305 | A1* | 11/2004 | Oh | A47L 9/1625 55/345 |
| 2005/0066469 | A1* | 3/2005 | Oh | A47L 9/165 15/353 |
| 2005/0166560 | A1* | 8/2005 | Takemoto | A47L 9/102 55/482 |
| 2006/0213161 | A1* | 9/2006 | Archambault | A47L 5/38 55/467 |
| 2006/0254226 | A1* | 11/2006 | Jeon | A47L 9/1625 55/345 |
| 2007/0144116 | A1* | 6/2007 | Hong | A47L 9/0081 55/345 |
| 2008/0190080 | A1* | 8/2008 | Oh | A47L 9/1625 55/343 |
| 2008/0264007 | A1* | 10/2008 | Oh | A47L 9/108 55/304 |
| 2008/0295466 | A1* | 12/2008 | Cha | A47L 9/122 55/296 |
| 2010/0132316 | A1* | 6/2010 | Ni | A47L 9/1625 55/343 |
| 2010/0154367 | A1* | 6/2010 | Luo | A47L 5/362 55/337 |
| 2010/0229328 | A1* | 9/2010 | Conrad | A47L 5/24 15/344 |
| 2011/0219574 | A1* | 9/2011 | Conrad | A47L 9/1683 15/347 |
| 2011/0219581 | A1 | 9/2011 | Vines et al. | |
| 2011/0314629 | A1 | 12/2011 | Conrad | |
| 2012/0284955 | A1* | 11/2012 | Han | A47L 5/362 15/353 |
| 2013/0091660 | A1* | 4/2013 | Smith | A47L 9/165 15/353 |
| 2015/0289737 | A1* | 10/2015 | Riru | A47L 9/165 55/419 |

FOREIGN PATENT DOCUMENTS

| | | |
|---|---|---|
| CN | 101108105 A | 1/2008 |
| CN | 101108106 A | 1/2008 |
| CN | 101411603 A | 4/2009 |
| CN | 101437596 A | 5/2009 |
| CN | 201333002 Y | 10/2009 |
| CN | 101658405 A | 3/2010 |
| CN | 101721174 A | 6/2010 |
| CN | 101756675 A | 6/2010 |
| CN | 102334954 | 2/2012 |
| CN | 202821202 U | 3/2013 |
| CN | 203341657 U | 12/2013 |
| CN | 203841620 U | 9/2014 |
| JP | 2003180584 A | 7/2003 |
| JP | 2010119623 A | 3/2010 |
| WO | 2011112289 A2 | 9/2011 |

OTHER PUBLICATIONS

U.S. Appl. No. 14/852,920 Non Final Office Action dated Dec. 1, 2015, 14 pages.
U.S. Appl. No. 14/851,926 Non Final Office Action dated Nov. 16, 2015, 11 pages.
PCT/CN2014/075112 English translation of the International Search Report & Written Opinion mailed Jul. 16, 2014, 13 pages.
PCT/CN2014/075272 English translation of the International Search Report mailed Jan. 28, 2015, 2 pages.
PCT/CN2014/075274 English translation of the International Search Report mailed Feb. 4, 2015, 2 pages.

* cited by examiner

CYCLONE SEPARATOR

RELATED APPLICATION

This application is a continuation of International Patent Application No. PCT/CN2014/075274, filed Apr. 14, 2014, the entire content of which is incorporated by reference as part of the disclosure of this U.S. application.

FIELD

Embodiments of the present invention generally relate to a household appliance field, and more particularly, to a cyclone separator.

BACKGROUND

In the related art, a cyclone separator generally includes a cyclone, a central filter disposed within the cyclone and configured to filter out dirt such as dust, and a wind guiding pipe communicating with an outside wall of the cyclone in a tangential direction.

However, since air with dust goes inwards from a side wall of the cyclone, the dust tends to adhere to the central filter, thus blocking the filter. Furthermore, since the cyclone usually has a cylinder shape, the sealing between an air inlet pipe and the cyclone is poor, thus affecting the dust-collection efficiency of a dust collector and resulting in a high cost of a part therein.

SUMMARY

Embodiments of the present invention seek to solve at least one of the problems existing in the related art to at least some extent. Accordingly, an object of the present invention is to provide a cyclone separator, which adopts a bottom wind intake, and air with dust enters a cyclone in a direction away from a filter. The cyclone separator may be used in an apparatus such as a dust collector.

The cyclone separator according to embodiments of the present invention includes: a cyclone having an open end and a bottom wall defining an inlet of the cyclone separator therein; an end cover of the cyclone separator disposed over the cyclone and defining an outlet of the cyclone separator therein; a filter having an upper end communicating with the outlet of the cyclone separator and a lower end extended into the cyclone; a wind guiding cylinder having a lower end communicating with the inlet of the cyclone separator, a closed upper end and a side wall defining a vent communicating with the cyclone.

The cyclone separator according to embodiments of the present invention adopts the bottom wind intake, and the air with dust entering the cyclone separator goes into the cyclone in the direction away from the filter. Thus, the air with dust entering the cyclone turns into a spiral airflow quickly, and the dust is thrown away from the filter under a centrifugal force, which prevents the dust from adhering to the filter to block the filter. The cyclone separator according to embodiments of the present invention reduces the probability of blocking the filter, and thus a working life of the filter is improved and a cleaning frequency of the filter is reduced.

In addition, the cyclone separator according to embodiments of the present invention further includes following additional features.

In an embodiment of the present invention, a wind guiding plate and a wind shielding plate are disposed within the cyclone, at least a part of the wind guiding plate is extended upwards in a spiral shape, the wind shielding plate is disposed above the vent, and the wind shielding plate is not higher than an upper edge of the wind guiding plate. Thus, a wind guiding structure in which the airflow goes upwards in the spiral shape is adopted, so that a position in which the dust is thrown out is moved upwards to the most extent. With the effective cyclone separator, the airflow with dust rises and speeds up on the wind guiding plate and then is thrown out of the cyclone, so that the dust is separated from the air quickly and completely, while belt-shaped things such as hair are also thrown out easily, and thus the dust and hair to be discharged from the cyclone separator through the filter are reduced. In this way, a suction of the whole dust collector having the cyclone separator will not decrease rapidly due to the blocking of a filter cotton, and thus the separation efficiency is improved greatly and a cleaning cycle of the filter cotton is prolonged.

In an embodiment of the present invention, the wind guiding plate is configured to have an annular shape and includes: a first plate body and a second plate body perpendicular to an axis of the cyclone respectively; a spiral wind guiding plate extended in the spiral shape in an up and down direction and having two ends connected to the first plate body and the second plate body respectively; a connection plate parallel to the axis of the cyclone and having two ends connected to the first plate body and the second plate body respectively. Thus, the wind guiding plate has a simple structure and is easy to be molded, and it is convenient for the connection plate to guide the airflow with dust, so that the airflow with dust can rise in the spiral shape to perform an air-dust separation.

In an embodiment of the present invention, the first plate body is disposed at a lower edge of the vent, the wind shielding plate is disposed at an upper edge of the vent, the second plate body is in flush with the wind shielding plate, and the connection plate is disposed at a side edge of the vent. Thus, it is easy for the airflow with dust to rise in the spiral shape, which avoids causing a poor filtering effect and blocking the filter due to a direct rise of the airflow with dust, and improves the separation efficiency and separation effect of the cyclone separator on the airflow with dust. Moreover, an amount of the dust passing through the filter can be reduced by throwing the dust out.

In an embodiment of the present invention, the wind guiding plate is the bottom wall of the cyclone, and the inlet of the cyclone separator is formed in the wind guiding plate. Thus, by using the wind guiding plate as the bottom wall of the cyclone directly, the cyclone has a simple structure and is easy to be molded, thus improving a molding efficiency of the cyclone.

In an embodiment of the present invention, a wind inlet pipe communicating with the inlet of the cyclone separator is disposed at the bottom wall of the cyclone. Thus, it is convenient for the cyclone separator to connect with a dust cup of a dust-collection device, improving a mounting efficiency of the cyclone separator.

In an embodiment of the present invention, the cyclone separator further includes a cylinder body and a baffle, in which the baffle is disposed within the cylinder body and configured to separate space within the cylinder body in an up and down direction, an upper portion of the cylinder body is configured as the filter and a lower portion of the cylinder body is configured as the wind guiding cylinder. Thus, the wind guiding cylinder is formed with the filter integrally, which simplifies the structure of the cyclone separator and facilitates manufacturing and assembling the cyclone separator.

In an embodiment of the present invention, the wind guiding plate has a height larger than or equal to a half of a depth of the wind guiding cylinder and less than or equal to a depth of the cyclone. Thus, a wind guiding effect of the cyclone is improved, and it is convenient for the airflow to rise in the spiral shape.

In an embodiment of the present invention, the end cover of the cyclone separator is spaced from an upper edge of the cyclone, and a distance between the upper edge of the cyclone and the end cover of the cyclone separator is less than or equal to a height of the wind guiding plate. Thus, it is convenient for impurities such as dust separated from the cyclone to be thrown out in a 360-degree omnibearing direction, the position in which the dust is thrown out is not limited, and it is convenient for the cyclone separator to separate the airflow with dust.

In an embodiment of the present invention, the filter is configured to have a cylinder shape, the cyclone is configured to have a cylinder shape whose center line is coincident with a center line of the filter, and a radius of the filter is less than or equal to a half of a radius of the cyclone. Thus, it is convenient for the impurities such as dust to be thrown out, the impurities such as dust are prevented from adhering to the filter to block the filter, and the dust is prevented from passing through the filter to increase a dust removal currency of the filter cotton. Therefore, the cyclone separator according to embodiments of the present invention can improve the separation efficiency of the airflow with dust.

REFERENCE NUMERALS

Figure 1:
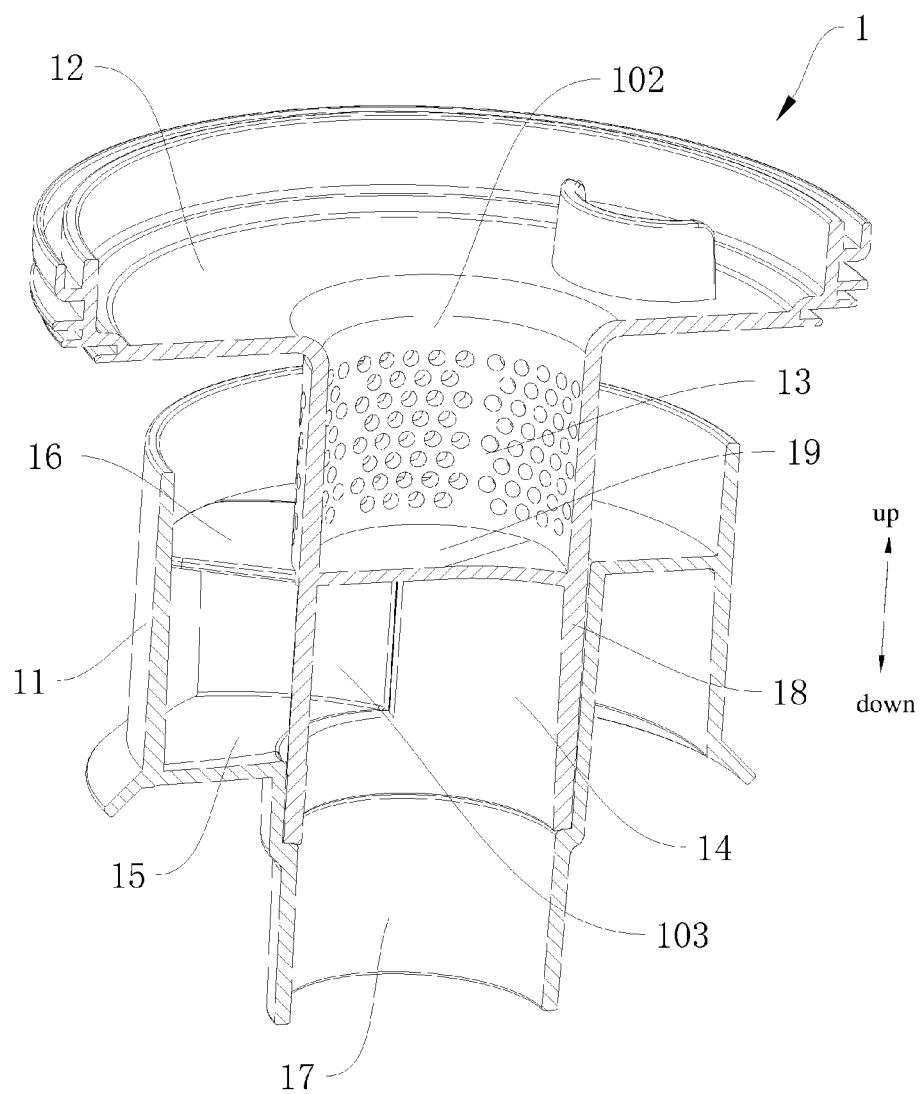
FIG. 1 is a cross sectional view of a cyclone separator according to an embodiment of the present invention.

Cyclone separator 1; cyclone 11; end cover of the cyclone separator 12; filter 13; wind guiding cylinder 14; wind guiding plate 15; wind shielding plate 16; wind inlet pipe 17; cylinder body 18; baffle 19; inlet of the cyclone separator 101; outlet of the cyclone separator 102; vent 103; cylinder-shaped side plate 111; clamping groove 141; chute 142; first plate body 151; second plate body 152; spiral wind guiding plate 153; connection plate 154; clamping protrusion 171;

Height H1 of the wind guiding plate 15;

Depth H2 of the cyclone 11;

Distance H3 between the end cover 12 of the cyclone separator and an upper edge of the cyclone 11;

Radius R1 of the filter 13;

Radius R2 of the cyclone 11;

Distance R3 between the cyclone 11 and the filter 13 in a radial direction.

DETAILED DESCRIPTION

Reference will be made in detail to embodiments of the present disclosure. Embodiments of the present disclosure will be shown in drawings, in which the same or similar elements and the elements having same or similar functions are denoted by like reference numerals throughout the descriptions. The embodiments described herein according to drawings are explanatory and illustrative, not construed to limit the present disclosure.

In the specification, unless specified or limited otherwise, relative terms such as "central", "longitudinal", "lateral", "length", "width", "thickness", "up", "down", "front", "rear", "left", "right", "vertical", "horizontal", "top", "bottom", "inner", "outer", "clockwise", "anticlockwise" as well as derivative thereof (e.g., "horizontally", "downwardly", "upwardly", etc.) should be construed to refer to the orientation as then described or as shown in the drawings under discussion. These relative terms are for convenience of description and do not require that the present disclosure be constructed or operated in a particular orientation.

In addition, terms such as "first" and "second" are used herein for purposes of description and are not intended to indicate or imply relative importance or significance. Thus, features limited by "first" and "second" are intended to indicate or imply including one or more than one these features. In the description of the present disclosure, "a plurality of" relates to two or more than two.

In the description of the present disclosure, unless specified or limited otherwise, it should be noted that, terms "mounted," "connected" and "coupled" may be understood broadly, such as permanent connection or detachable connection, electronic connection or mechanical connection, direct connection or indirect connection via intermediary, inner communication or interreaction between two elements. These having ordinary skills in the art should understand the specific meanings in the present disclosure according to specific situations.

In the description of the present disclosure, a structure in which a first feature is "on" a second feature may include an embodiment in which the first feature directly contacts the second feature, and may also include an embodiment in which an additional feature is formed between the first feature and the second feature so that the first feature does not directly contact the second feature, unless otherwise specified. Furthermore, a first feature "on," "above," or "on top of" a second feature may include an embodiment in which the first feature is right "on," "above," or "on top of" the second feature, and may also include an embodiment in which the first feature is not right "on," "above," or "on top of" the second feature, or just means that the first feature has a sea level elevation larger than the sea level elevation of the second feature. While first feature "beneath," "below," or "on bottom of" a second feature may include an embodiment in which the first feature is right "beneath," "below," or "on bottom of" the second feature, and may also include an embodiment in which the first feature is not right "beneath," "below," or "on bottom of" the second feature, or just means that the first feature has a sea level elevation smaller than the sea level elevation of the second feature.

A cyclone separator according to an embodiment of the present invention will be described in the following with reference to drawings. The cyclone separator may be used in a dust collector.

Figure 2:
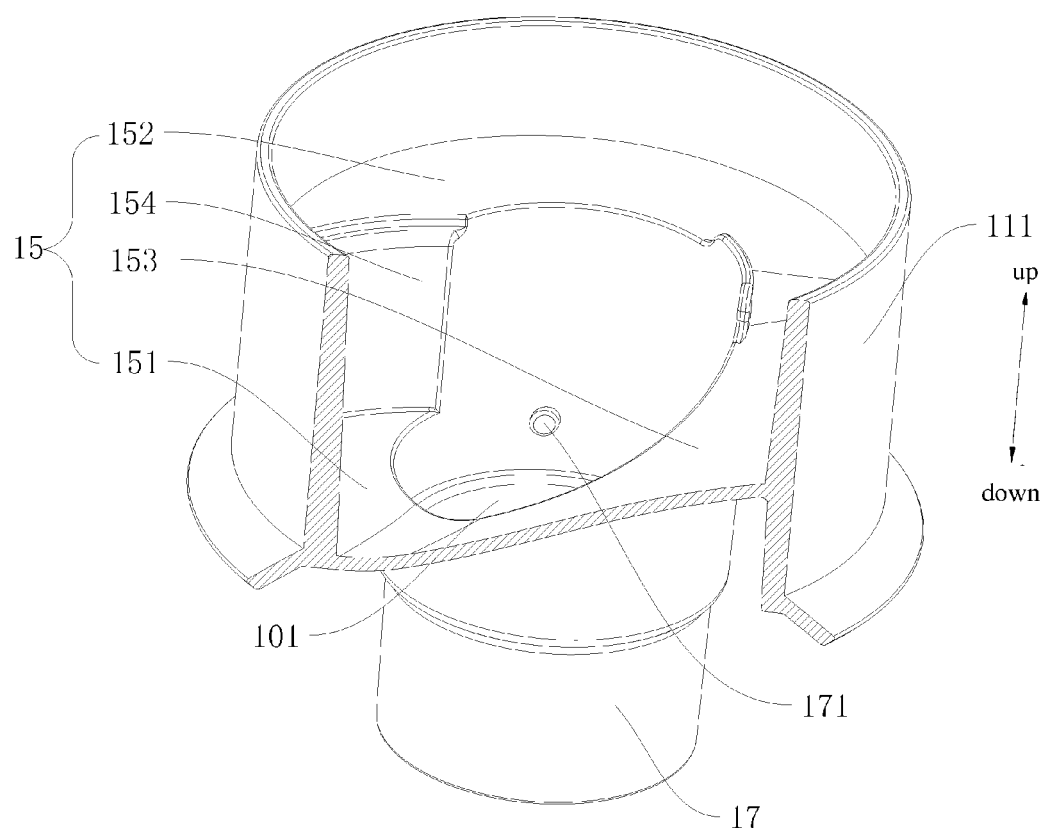
FIG. 2 is a cross sectional view of a cyclone of a cyclone separator according to an embodiment of the present invention.
Figure 3:
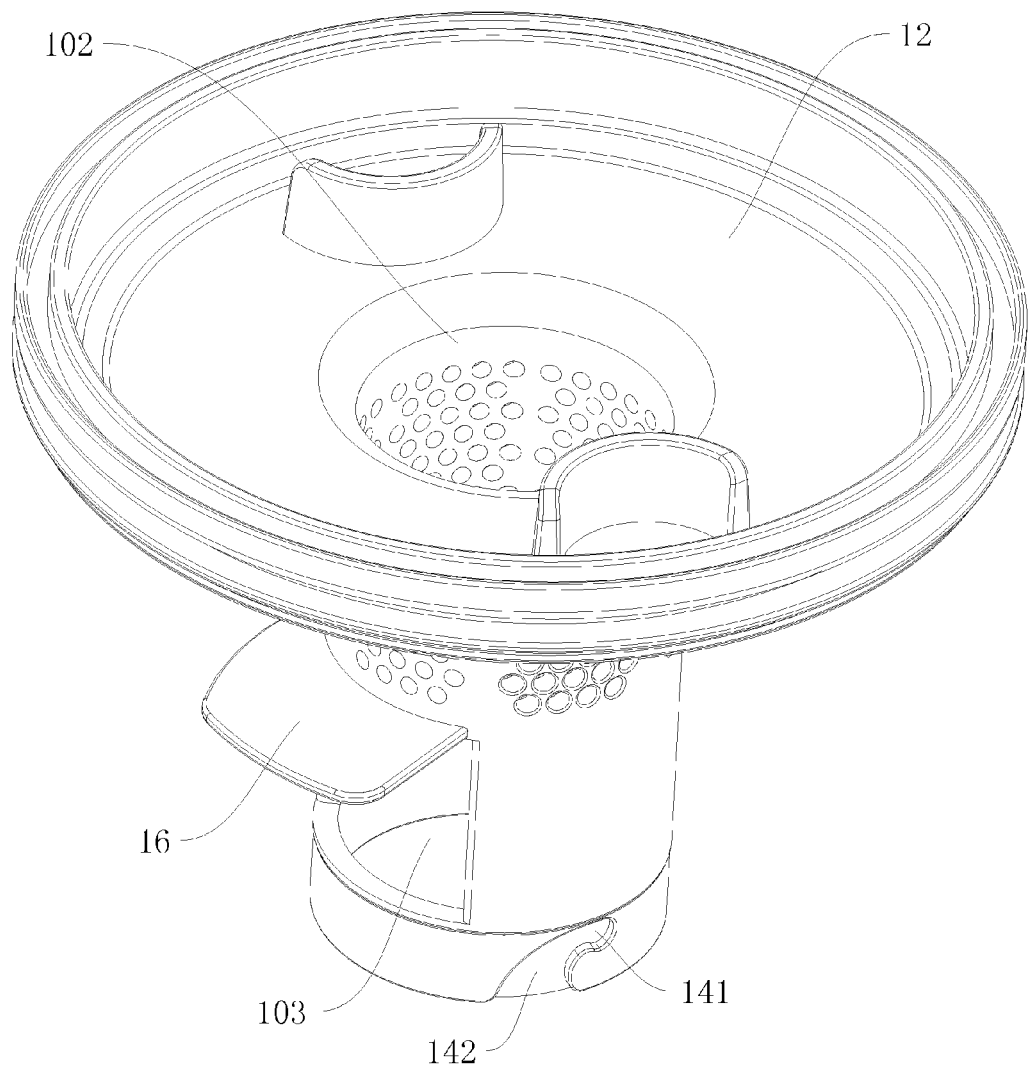
FIG. 3 is a schematic view showing a fitting between a filter and an end cover of a cyclone separator according to an embodiment of the present invention.

As shown in FIGS. 1 to 3, the cyclone separator 1 according to embodiments of the present invention includes: a cyclone 11, an end cover 12 of the cyclone separator, a filter 13 and a wind guiding cylinder 14.

Specifically, the cyclone 11 has an open top end and a bottom wall defining an inlet 101 of the cyclone separator, and the inlet 101 of the cyclone separator is configured to bring air with dust into the cyclone 11 so as to separate the air with dust into air and dust. The end cover 12 of the cyclone separator is disposed above the cyclone 11, and an outlet 102 of the cyclone separator is formed in the end cover 12 of the cyclone separator. The air with dust is sucked into the cyclone separator 1 through the inlet 101 of the cyclone separator and then filtered by the cyclone separator 1. In the filtering process, the dust is separated from the air and thrown out of the cyclone 11, and the filtered air is discharged from the outlet 102 of the cyclone separator. The filter 13 is configured to filter the air with dust, so that the air is discharged from the cyclone separator 1 through the filter 13. The filter 13 has an upper end communicating with the outlet 102 of the cyclone separator, and the upper end of the filter 13 encloses a periphery of the outlet 102 of the cyclone separator, so that the air with dust cannot pass through the outlet 102 of the cyclone separator, and only the air filtered by the filter 13 can be discharged out of the cyclone separator 1 from the outlet 102 of the cyclone separator. The filter 13 has a lower end extended into the cyclone 11. The wind guiding cylinder 14 has a lower end communicating with the inlet 101 of the cyclone separator and a closed upper end. The wind guiding cylinder 14 has a side wall defining a vent 103 therein communicating with cyclone 11, so that the airflow enters the cyclone 11 in a radial direction of the cyclone 11, and thus it is convenient for a filtering of the cyclone separator 1 and for the dust to be thrown out of the cyclone 11.

The cyclone separator according to embodiments of the present invention adopts the bottom wind intake, and the air with dust entering the cyclone separator 1 goes into the cyclone 11 in a direction away from the filter 13. Thus, the air with dust entering the cyclone 11 turns into a spiral airflow quickly, and the dust is thrown away from the filter 13 under a centrifugal force, which prevents the dust from adhering to the filter 13 to block the filter 13. The cyclone separator according to embodiments of the present invention reduces the probability of blocking the filter 13, and thus a working life of the filter 13 is improved and a cleaning frequency of the filter 13 is reduced.

It should be noted that the cyclone separator 1 according to embodiments of the present invention may be used in the dust collector, but not limited to this.

In addition, when the cyclone separator 1 is connected with a dust cup of a dust-collection device, it is convenient for an air inlet pipe connecting the dust cup with the cyclone separator 1 to be connected with the cyclone separator 1, so that the sealing between the air inlet pipe and the cyclone separator 1 is good and a cost thereof is reduced.

Furthermore, the dust cup connected with the cyclone separator may be a dust cup with a bottom air intake, or not. For example, the cyclone separator according to embodiments of the present invention may be disposed within a dust cup with a side wind intake, so that the inlet 101 of the cyclone separator in the bottom wall of the cyclone separator is connected with a wind inlet in a side wall of the dust cup. This is may be understood by those skilled in the related art.

As shown in FIGS. 1 to 3, in some embodiments of the present invention, a wind guiding plate 15 and a wind shielding plate 16 are disposed within the cyclone 11. At least a part of the wind guiding plate 15 is extended upwards in a spiral shape, the wind shielding plate 16 is disposed above the vent 103, and the wind shielding plate 16 is not higher than an upper edge of the wind guiding plate 15. In other words, the airflow entering the cyclone 11 can rise spirally in an extension direction of the wind guiding plate 15 under the action of the wind guiding plate 15 and the wind shielding plate 16. Therefore, a wind guiding structure in which the airflow goes upwards in the spiral shape is adopted, so that a position in which the dust is thrown out is moved upwards to the most extent. With the effective cyclone separator 1, the airflow with dust rises and speeds up on the wind guiding plate 15 and then is thrown out of the cyclone 11, so that the dust is separated from the air quickly and completely, while belt-shaped things such as hair are also thrown out easily, and thus the dust and hair to be discharged from the cyclone separator 1 through the filter 13 are reduced. In this way, a suction of the whole dust collector having the cyclone separator 1 will not decrease rapidly due to the blocking of a filter cotton, and thus the separation efficiency is improved greatly and a cleaning cycle of the filter cotton is prolonged.

Those ordinary skilled in the related art may understand that, the wind guiding plate 15 and the wind shielding plate 16 according to embodiments of the present invention are configured for a spiral rise of the airflow with dust. Certainly, a solution in embodiments of the present invention to perform the spiral rise of the airflow with dust is not limited to this, and other types of wind guiding structures in the related art may be used, for example a spiral wind channel may be formed in the wind guiding cylinder.

Furthermore, as shown in FIG. 2, the wind guiding plate 15 is configured to have an annular shape and includes: a first plate body 151, a second plate body 152, a spiral wind guiding plate 153 and a connection plate 154. The first plate body 151 and the second plate body 152 are perpendicular to an axis of the cyclone 11 respectively. The connection plate 154 is parallel to the axis of the cyclone 11. In other words, the first plate body 151 and the second plate body 152 are parallel with each other, and each of the first plate body 151 and the second plate body 152 is perpendicular to the axis of the cyclone, or with reference to FIG. 2, the first plate body 151 and the second plate body 152 are perpendicular to an up and down direction as shown in FIG. 2, and the connection plate 154 is parallel with the up and down direction as shown in FIG. 2. The spiral wind guiding plate 153 is extended in the spiral shape in the up and down direction, i.e., the spiral wind guiding plate 153 is extended upwards in the spiral shape. The first plate body 151 has a first end connected with a lower end of the spiral wind guiding plate 153 and a second end connected with a lower end of the connection plate 154. The second plate body 152 has a first end connected with an upper end of the spiral wind guiding plate 153 and a second end connected with an upper end of the connection plate 154. Thus, the wind guiding plate 15 has a simple structure and is easy to be molded, and it is convenient for the wind guiding plate 15 to guide the airflow with dust, so that the airflow with dust can rise in the spiral shape to perform an air-dust separation.

Furthermore, the first plate body 151 is disposed at a lower edge of the vent 103, the wind shielding plate 16 is disposed at an upper edge of the vent 103, the second plate body 152 is in flush with the wind shielding plate 16, and the connection plate 154 is disposed at a side edge of the vent 103. In other words, the wind shielding plate 16 is disposed at the upper edge of the vent 103, the connection plate 154 is disposed at the side edge of the vent 103, and the wind shielding plate 16 and the connection plate 154 have a function of shielding the airflow, so that the airflow flows along the first plate body 151, the spiral wind guiding plate 153 and the second plate body 152 in turn, and thus the airflow rises in the spiral shape. Or, with the wind shielding plate 16 and the connection plate 154 shielding the airflow entering the cyclone 11 from the vent 103, the air with dust is prevented from rising up directly, so that it is easy for the airflow with dust to rise spirally in the extension direction of the wind guiding plate 15, and thus resulting in the airflow rising up in the spiral shape so as to throw out the dust by the centrifugal force. Thus, it is easy for the airflow with dust to rise in the spiral shape, which avoids causing a poor filtering effect and blocking the filter due to a direct rise of the airflow with dust, and improves the separation efficiency and separation effect of the cyclone separator 1 on the airflow with dust. Moreover, an amount of the dust passing through the filter can be reduced by throwing the dust out.

Advantageously, the wind guiding plate 15 may be the bottom wall of the cyclone 11, and the inlet 101 of the cyclone separator is formed in the wind guiding plate 15. In other words, the cyclone 11 includes a cylinder-shaped side plate 111 and the wind guiding plate 15. The wind guiding plate 15 is disposed within the cylinder-shaped side plate 111 and has an annular shape. The annular wind guiding plate 15 has the inlet of the cyclone separator in a center thereof. Thus, by using the wind guiding plate 15 as the bottom wall of the cyclone 11 directly, the cyclone 11 has a simple structure and is easy to be molded, thus improving a molding efficiency of the cyclone 11.

Those ordinary skilled in the related art may understand that, the wind guiding plate 15 in embodiments of the present invention may not be the bottom wall of the cyclone 11, for example the cyclone 11 may be a cylinder with a closed bottom, and the wind guiding plate is disposed within the cyclone 11.

In addition, the wind guiding structure may be constructed by a cooperation of a plate body extended spirally and a connection plate connecting a head of the spiral plate body with a tail of the spiral plate body.

As shown in FIGS. 1 and 2, in some embodiments of the present invention, a wind inlet pipe 17 communicating with the inlet 101 of the cyclone separator is disposed at the bottom wall of the cyclone 11. Thus, it is convenient for the cyclone separator 1 to connect with the dust cup of the dust-collection device, improving a mounting efficiency of the cyclone separator 1.

The wind inlet pipe 17 in embodiments of the present invention does not need special plastic materials, thus reducing a molding cost of the wind inlet pipe 17.

As shown in FIGS. 1-3, a lower end of the wind guiding cylinder 14 is fitted on an inner wall of the wind inlet pipe 17. A clamping protrusion 171 is disposed on the inner wall of the wind inlet pipe 17, and a clamping groove 141 adapted to fit with the clamping protrusion 171 is formed in an outer wall surface of the lower end of the wind guiding cylinder 14. The wind guiding cylinder 14 is fitted within the wind inlet pipe 17 by a clamping between the clamping protrusion 171 and the clamping groove 141. Thus, by fitting the wind guiding cylinder 14 on the inner wall of the wind inlet pipe 17, a sealing performance of a junction between the wind guiding cylinder 14 and the wind inlet pipe 17 is improved, so that the wind guiding cylinder 14 can close the wind inlet pipe 17. Moreover, the wind guiding cylinder 14 is connected with the wind inlet pipe 17 by a fitting between the clamping protrusion 171 and the clamping groove 141, which facilitates the mounting of the wind guiding cylinder 14 and improves the mounting efficiency of the cyclone separator.

In addition, those ordinary skilled in the related art may understand that, the wind guiding cylinder 14 may be formed with the wind inlet pipe 17 integrally, or the wind guiding cylinder 14 may be connected with the wind inlet pipe 17 by welding, bolted connection or clamping.

With reference to FIG. 3, a chute 142 is formed in the wind guiding cylinder 14. The chute 142 has a first end extended to a lower edge of the wind guiding cylinder 14 in a spiral direction and opened there, and a second end communicating with the clamping groove 141. In a mounting process of the wind guiding cylinder 14, the clamping protrusion 171 is directed at the opened first end of the chute 142, and the wind guiding cylinder 14 is rotated to slide the clamping protrusion 171 into the clamping groove 141 along the chute 142, so that the clamping protrusion 171 is clamped with the clamping groove 141.

In addition, there may a plurality of clamping protrusions 171 and clamping grooves 141, in which the clamping protrusion 171 is corresponding to the clamping groove 141 one by one.

As shown in FIG. 1, in some embodiments of the present invention, the cyclone cylinder 1 further includes a cylinder body 18 and a baffle 19. The baffle 19 is disposed within the cylinder body 18 and configured to separate space within the cylinder body 18 in the up and down direction. An upper portion of the cylinder body 18 is configured as the filter 13 and a lower portion of the cylinder body 18 is configured as the wind guiding cylinder 14. In other words, the filter 13 and the wind guiding cylinder 14 are formed integrally. Thus, the wind guiding cylinder 14 is formed with the filter 13 integrally, which simplifies the structure of the cyclone separator 1 and facilitates manufacturing and assembling the cyclone separator 1.

Certainly, the wind guiding cylinder 14 and the filter 13 may be formed respectively, and the filter 13 is located right above the wind guiding cylinder 14.

As shown in FIGS. 1 and 3, in an embodiment of the present invention, the filter 13 is formed with the end cover 12 of the cyclone separator integrally. Therefore, a sealing performance of a junction between the filter 13 and the dust cup is improved, thus further improving a suction of the dust collector having the cyclone separator so as to improve the dust-collection efficiency thereof.

Figure 4:
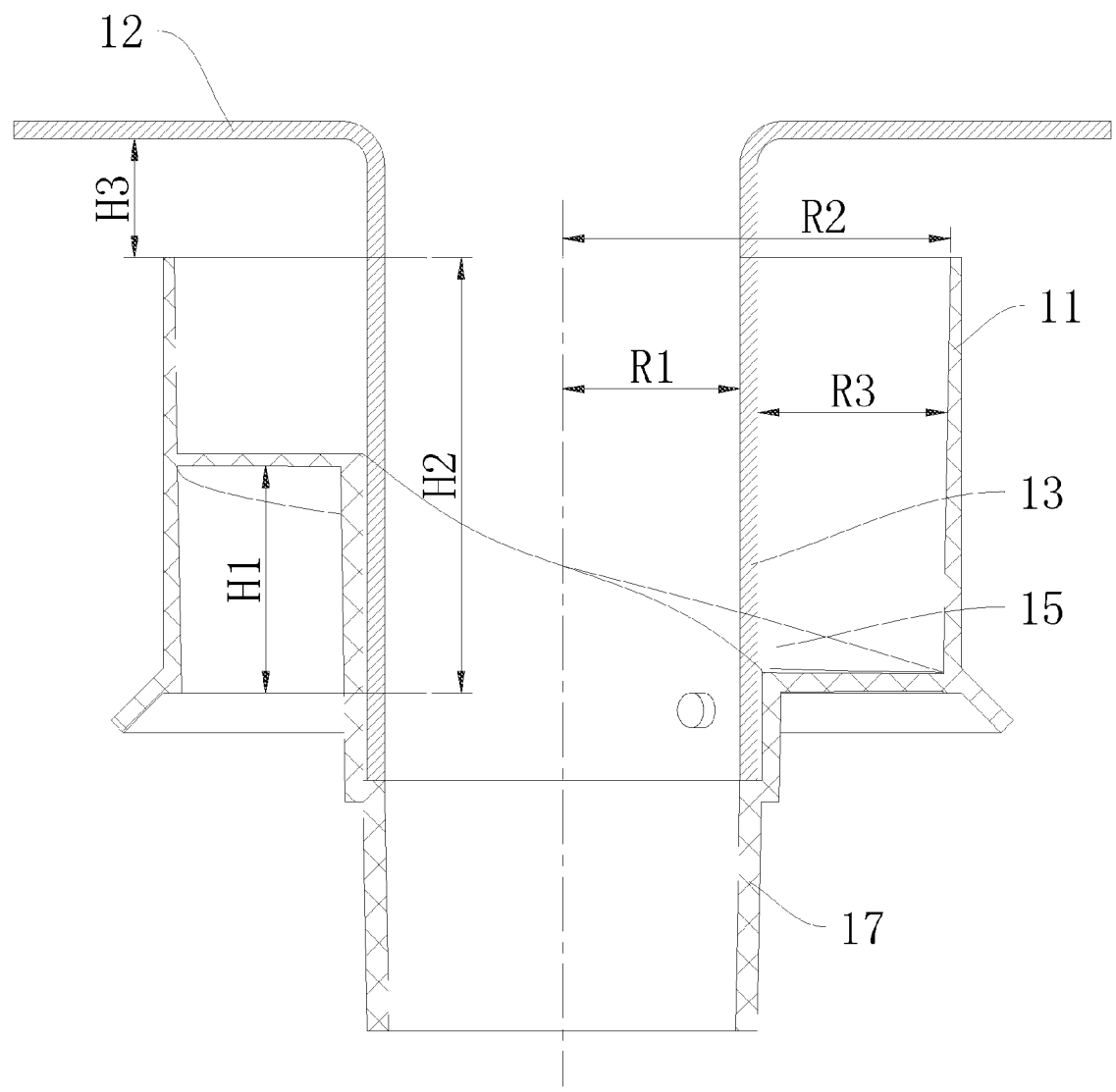
FIG. 4 is a schematic view of a cyclone separator according to an embodiment of the present invention.

As shown in FIGS. 1 and 4, in some embodiments of the present invention, the end cover 12 of the cyclone separator is spaced from an upper edge of the cyclone 11. Thus, it is convenient for impurities such as dust separated out of the cyclone 11 to be thrown out in a 360-degree omnibearing direction, the position in which the dust is thrown out is not limited, and it is convenient for the cyclone separator 1 to separate the airflow with dust.

Furthermore, each of the filter 13 and the cyclone 11 has a cylinder shape, and a center line of the cyclone 11 is coincident with a center line of the wind guiding cylinder 14.

With reference to FIG. 4, the wind guiding plate 15 has a height H1 larger than or equal to a half of a depth H2 of the cyclone 11 and less than or equal to a depth H2 of the cyclone 11. In other words, $0.5H2 \leq H1 \leq H2$. Thus, a wind guiding effect of the cyclone 11 is improved, and it is convenient for the airflow to rise in the spiral shape.

Furthermore, a distance H3 between the upper edge of the cyclone 11 and the end cover 12 of the cyclone separator is less than or equal to a height H1 of the wind guiding plate 15. Thus, it is convenient for the impurities such as dust to be thrown out, so that the dust can be prevented from being accumulated in the cyclone 1, and it is also convenient for the impurities such as dust to be accumulated in the dust cup.

Advantageously, a radius R1 of the filter 13 is less than or equal to a half of a radius R2 of the cyclone 11. In other words, a distance R3 between the cyclone 11 and the filter 13 in a radial direction is larger than or equal to a half of the radius R2 of the cyclone 11, and the distance R3 between the cyclone 11 and the filter 13 in the radial direction is less than or equal to the radius R2 of the cyclone 11. Or, a distance R3 of the radius of the cyclone 11 and the radius of the filter 13 is larger than or equal to a half of the radius R2 of the cyclone 11, and the distance R3 of the radius of the cyclone 11 and the radius of the filter 13 is less than or equal to the radius R2 of the cyclone 11, i.e., ½R2≤R3≤R2. Thus, it is convenient for the impurities such as dust to be thrown out, the impurities such as dust are prevented from adhering to the filter 13 to block the filter 13, and the dust is prevented from passing through the filter 13 to increase a dust removal currency of the filter cotton.

Therefore, the cyclone separator according to embodiments of the present invention can improve the separation efficiency of the airflow with dust.

A specific embodiment of the present invention will be described in the following with reference to FIGS. 1 to 4.

As shown in FIGS. 1 to 4, the present invention implements a high sealing performance and a high suction, and ensures a low cost at the same time.

Specifically, the cyclone separator 1 includes: a cyclone 11, a filter 13 disposed within the cyclone 11 and in a center of the cyclone 11, an end cover 12 of the cyclone separator disposed above the filter 13. A gap is formed between the end cover 12 of the cyclone separator and an upper edge of the cyclone 11, and a wind inlet pipe 17 is connected to a center of the bottom of the cyclone 11. After entering the cyclone 11 through the wind inlet pipe 17, the air with dust is accelerated and rotated by the wind guiding plate 15 within the cyclone 11, in which the wind guiding plate 15 is between the wind inlet pipe 17 and the filter 13.

With a wind inlet structure in a center and a lower portion of the cyclone separator 1, the power loss is reduced, and also, a position in which the dust is thrown out is moved upwards to the most extent. With the effective cyclone separator, the airflow with dust rises and speeds up in a spiral runway and is thrown out freely in a 360-degree omnibearing direction, not limited to a position in which the dust is thrown out, so that the separation is more complete. Meanwhile, belt-shaped things such as hair are also thrown out easily, and a suction of the whole machine will not decrease rapidly due to the blocking of a filter cotton, and thus the separation efficiency is improved greatly and a cleaning cycle of the filter cotton is prolonged.

Those ordinary skilled in the related art may understand that, the end cover 12 of the cyclone separator and the filter 13 may be formed integrally or by assembling a plurality of parts after the plurality of parts are formed; the wind inlet pipe 17, the wind guiding plate 15 and the cyclone 11 may be formed integrally or by assembling a plurality of parts after the plurality of parts are formed; the filter 13, the end cover 12 of the cyclone separator and the wind inlet pipe 17 may be formed integrally or by assembling a plurality of parts after the plurality of parts are formed; the wind guiding plate 15 and the cyclone 11 may be formed integrally or by assembling a plurality of parts after the plurality of parts are formed.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present invention. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present invention. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present invention, and changes, alternatives, and modifications can be made in the embodiments without departing from spirit, principles and scope of the present invention.

What is claimed is:

1. A cyclone separator, comprising:
    a cyclone having an open end and a bottom wall defining an inlet of the cyclone separator therein;
    an end cover of the cyclone separator disposed over the cyclone and defining an outlet of the cyclone separator therein;
    a filter having an upper end communicating with the outlet of the cyclone separator and a lower end extended into the cyclone;
    a wind guiding cylinder having a lower end communicating with the inlet of the cyclone separator, a closed upper end and a side wall defining a vent communicating with the cyclone,
    wherein the cyclone separator further comprises a cylinder body and a baffle, the baffle is disposed within the cylinder body and configured to separate space within the cylinder body in an up and down direction, an upper portion of the cylinder body is configured as the filter and a lower portion of the cylinder body is configured as the wind guiding cylinder.

2. The cyclone separator according to claim 1, wherein the filter is configured to have a cylinder shape, the cyclone is configured to have a cylinder shape whose center line is coincident with a center line of the filter, and a radius of the filter is less than or equal to a half of a radius of the cyclone.

3. The cyclone separator according to claim 1, wherein a wind inlet pipe communicating with the inlet of the cyclone separator is disposed at the bottom wall of the cyclone.

4. The cyclone separator according to claim 3, wherein a lower end of the wind guiding cylinder is fitted on an inner wall of the wind inlet pipe, a clamping protrusion is disposed on the inner wall of the wind inlet pipe, and a clamping groove adapted to fit with the clamping protrusion is formed in an outer wall surface of the lower end of the wind guiding cylinder.

5. The cyclone separator according to claim 4, wherein the wind guiding cylinder further defines a chute having a first end extended to a lower edge of the wind guiding cylinder in a spiral direction and opened there, and a second end communicating with the clamping groove.

6. The cyclone separator according to claim 1, wherein a wind guiding plate and a wind shielding plate are disposed within the cyclone, at least a part of the wind guiding plate is extended upwards in a spiral shape, the wind shielding plate is disposed above the vent, and the wind shielding plate is not higher than an upper edge of the wind guiding plate.

7. The cyclone separator according to claim 6, wherein the wind guiding plate is configured to have an annular shape and comprises:
    a first plate body and a second plate body perpendicular to an axis of the cyclone respectively;
    a spiral wind guiding plate extended in the spiral shape in an up and down direction and having an upper end connected with the second plate body and a lower end connected with the first plate body;

a connection plate parallel to the axis of the cyclone and having an upper end connected with the second plate body and a lower end connected with the first plate body.

8. The cyclone separator according to claim 7, wherein the first plate body is disposed at a lower edge of the vent, the wind shielding plate is disposed at an upper edge of the vent, the second plate body is in flush with the wind shielding plate, and the connection plate is disposed at a side edge of the vent.

9. The cyclone separator according to claim 6, wherein the wind guiding plate is the bottom wall of the cyclone, and the inlet of the cyclone separator is formed in the wind guiding plate.

10. The cyclone separator according to claim 6, wherein the wind guiding plate has a height larger than or equal to a half of a depth of the wind guiding cylinder and less than or equal to a depth of the cyclone.

11. The cyclone separator according to claim 6, wherein the end cover of the cyclone separator is spaced from an upper edge of the cyclone, and a distance between the upper edge of the cyclone and the end cover of the cyclone separator is less than or equal to a height of the wind guiding plate.

12. A dust collector, comprising a cyclone separator, wherein the cyclone separator comprises:

a cyclone having an open end and a bottom wall defining an inlet of the cyclone separator therein;

an end cover of the cyclone separator disposed over the cyclone and defining an outlet of the cyclone separator therein;

a filter having an upper end communicating with the outlet of the cyclone separator and a lower end extended into the cyclone;

a wind guiding cylinder having a lower end communicating with the inlet of the cyclone separator, a closed upper end and a side wall defining a vent communicating with the cyclone, wherein the cyclone separator further comprises a cylinder body and a baffle, the baffle is disposed within the cylinder body and configured to separate space within the cylinder body in an up and down direction, an upper portion of the cylinder body is configured as the filter and a lower portion of the cylinder body is configured as the wind guiding cylinder.

13. The dust collector according to claim 12, wherein a wind inlet pipe communicating with the inlet of the cyclone separator is disposed at the bottom wall of the cyclone.

14. The dust collector according to claim 13, wherein a lower end of the wind guiding cylinder is fitted on an inner wall of the wind inlet pipe, a clamping protrusion is disposed on the inner wall of the wind inlet pipe, and a clamping groove adapted to fit with the clamping protrusion is formed in an outer wall surface of the lower end of the wind guiding cylinder.

15. The dust collector according to claim 12, wherein a wind guiding plate and a wind shielding plate are disposed within the cyclone, at least a part of the wind guiding plate is extended upwards in a spiral shape, the wind shielding plate is disposed above the vent, and the wind shielding plate is not higher than an upper edge of the wind guiding plate.

16. The dust collector according to claim 15, wherein the wind guiding plate is configured to have an annular shape and comprises:

a first plate body and a second plate body perpendicular to an axis of the cyclone respectively;

a spiral wind guiding plate extended in the spiral shape in an up and down direction and having an upper end connected with the second plate body and a lower end connected with the first plate body;

a connection plate parallel to the axis of the cyclone and having an upper end connected with the second plate body and a lower end connected with the first plate body.

17. The dust collector according to claim 16, wherein the first plate body is disposed at a lower edge of the vent, the wind shielding plate is disposed at an upper edge of the vent, the second plate body is in flush with the wind shielding plate, and the connection plate is disposed at a side edge of the vent.

18. The dust collector according to claim 15, wherein the end cover of the cyclone separator is spaced from an upper edge of the cyclone, and a distance between the upper edge of the cyclone and the end cover of the cyclone separator is less than or equal to a height of the wind guiding plate.

* * * * *